(12) United States Patent
Lee et al.

(10) Patent No.: US 12,114,799 B2
(45) Date of Patent: Oct. 15, 2024

(54) VACUUM COOKING APPLIANCE

(71) Applicant: LG ELECTRONICS INC., Seoul (KR)

(72) Inventors: Jeonghyun Lee, Seoul (KR); Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 673 days.

(21) Appl. No.: 17/314,221

(22) Filed: May 7, 2021

(65) Prior Publication Data

US 2021/0259454 A1  Aug. 26, 2021

Related U.S. Application Data

(63) Continuation of application No. 15/855,569, filed on Dec. 27, 2017, now Pat. No. 11,019,953.

(30) Foreign Application Priority Data

Dec. 27, 2016  (KR) .................. 10-2016-0180503

(51) Int. Cl.
A47J 27/18  (2006.01)
A47J 27/00  (2006.01)
(Continued)

(52) U.S. Cl.
CPC ............. A47J 27/18 (2013.01); A47J 27/002 (2013.01); A47J 27/10 (2013.01); A47J 36/16 (2013.01)

(58) Field of Classification Search
CPC .......... A47J 27/18; A47J 27/002; A47J 27/10; A47J 36/16
(Continued)

(56) References Cited

U.S. PATENT DOCUMENTS 4,667,085 A * 5/1987 Remmel ............... A47J 27/002
219/439
4,922,079 A * 5/1990 Bowen .................... A47J 27/04
219/415
(Continued)

FOREIGN PATENT DOCUMENTS

EP  2 000 741  12/2008
EP  2 954 809  12/2015
(Continued)

OTHER PUBLICATIONS

CN101119664 (Year: 2023).*
(Continued)

Primary Examiner — Nathaniel E Wiehe
Assistant Examiner — Frederick F Calvetti
(74) Attorney, Agent, or Firm — KED & ASSOCIATES

(57) ABSTRACT

A vacuum cooking appliance is provided. The vacuum cooking appliance may include a housing in which a housing mount and a vacuum packing module mount may be located at adjacent positions, a first container configured to accommodate liquid inside an accommodation space therein and coupled to the container mount, a heater configured to heat the liquid accommodated inside the first container, a vacuum pressure generator installed at the vacuum packing module mount and configured to suction air inside a food packing container, and a vacuum packing module installed adjacent to the vacuum pressure generator and including a sealer configured to heat.

19 Claims, 10 Drawing Sheets

(51) Int. Cl.
*A47J 27/10* (2006.01)
*A47J 36/16* (2006.01)

(58) Field of Classification Search
USPC .................................................. 99/325, 472
See application file for complete search history.

(56) References Cited

U.S. PATENT DOCUMENTS

| | | | | |
|---|---|---|---|---|
| 5,239,808 A | * | 8/1993 | Wells | B65B 31/024 |
| | | | | 53/512 |
| 5,347,918 A | * | 9/1994 | Chen | A47J 27/08 |
| | | | | 99/403 |
| 5,988,050 A | * | 11/1999 | Foster, Jr. | A47J 47/10 |
| | | | | 426/106 |
| 6,405,645 B1 | * | 6/2002 | Green | A23B 4/26 |
| | | | | 99/468 |
| 7,059,240 B2 | * | 6/2006 | Kim | A47J 27/026 |
| | | | | 99/422 |
| 7,204,067 B2 | * | 4/2007 | Baptista | B65B 31/046 |
| | | | | 53/512 |
| 9,550,595 B2 | * | 1/2017 | Steidele | B65B 31/024 |
| 9,708,088 B2 | * | 7/2017 | Rausch | B65B 31/048 |
| 9,936,837 B1 | * | 4/2018 | Granberry | A47J 37/1209 |
| 10,661,933 B2 | * | 5/2020 | Bocks | B65B 31/024 |
| 10,709,282 B2 | * | 7/2020 | Lee | A47J 36/24 |
| 11,019,953 B2 | * | 6/2021 | Lee | A47J 27/002 |
| 11,292,655 B1 | * | 4/2022 | Fisher | B65D 21/0233 |
| 2008/0302253 A1 | * | 12/2008 | Salvaro | F24C 15/00 |
| | | | | 99/341 |
| 2008/0308177 A1 | * | 12/2008 | Thuot | B65B 31/04 |
| | | | | 141/65 |
| 2010/0221391 A1 | * | 9/2010 | Deng | C08J 7/043 |
| | | | | 220/573.1 |
| 2011/0061545 A1 | * | 3/2011 | Foster | A47J 36/00 |
| | | | | 99/407 |
| 2012/0137898 A1 | * | 6/2012 | Alipour | A47J 27/16 |
| | | | | 99/483 |
| 2013/0133522 A1 | * | 5/2013 | Denisart | B65D 65/466 |
| | | | | 99/295 |
| 2013/0240500 A1 | * | 9/2013 | Alipour | A47J 27/004 |
| | | | | 220/573.1 |
| 2013/0264333 A1 | | 10/2013 | Alipour | |
| 2014/0021191 A1 | * | 1/2014 | Moon | A47J 37/0629 |
| | | | | 34/220 |
| 2014/0348987 A1 | * | 11/2014 | Cheng | A47J 27/08 |
| | | | | 99/331 |
| 2015/0027089 A1 | * | 1/2015 | Owens | B29C 66/861 |
| | | | | 53/167 |
| 2015/0040516 A1 | * | 2/2015 | Torre | B65B 29/08 |
| | | | | 53/167 |
| 2015/0313400 A1 | * | 11/2015 | Hu | A47J 27/18 |
| | | | | 99/403 |
| 2016/0345610 A1 | * | 12/2016 | Backus | A47J 27/10 |
| 2017/0135383 A1 | | 5/2017 | Liss | |
| 2018/0184488 A1 | * | 6/2018 | Lee | B65B 51/148 |
| 2018/0263418 A1 | * | 9/2018 | Hedrington | A47J 37/1266 |
| 2021/0107724 A1 | * | 4/2021 | Cohen | B65D 33/004 |

FOREIGN PATENT DOCUMENTS

| | | |
|---|---|---|
| JP | 2002-15939 | 6/2002 |
| JP | 2002-159397 | 6/2002 |
| JP | 3599664 | 12/2004 |
| JP | 2005-247383 | 9/2005 |
| JP | 2008-175421 | 7/2008 |
| JP | 6498955 * | 4/2019 |
| KR | 10-2006-0013768 | 2/2006 |
| KR | 10-2012-0115212 | 10/2012 |
| KR | 10-1335304 | 12/2013 |
| KR | 10-1626414 | 6/2016 |
| KR | 10-2016-0133190 | 11/2016 |
| WO | WO 2013 /124872 | 8/2013 |
| WO | WO 2013 /134785 | 9/2013 |
| WO | WO 2015/056284 | 4/2015 |
| WO | WO 2016/182323 | 11/2016 |

OTHER PUBLICATIONS

KR101675769 (Year: 2023).*
CN104287616 (Year: 20).*
CN1046440484 (Year: 2023).*
WO2013124872 (Year: 2023).*
WO2015056284 (Year: 2023).*
JP2002159397 (Year: 2023).*
CA2773525 (Year: 2023).*
JP2021017287 (Year: 2023).*
WO2016077360 (Year: 2023).*
Korean Notice of Allowance dated Aug. 30, 2022.
European Search Report dated May 8, 2018 issued in Application No. 17210216.2.
European Search Report dated May 16, 2018 issued in Application No. 17210209.7.
U.S. Office Action dated Feb. 6, 2020 issued in U.S. Appl. No. 15/855,298.
U.S. Office Action dated Feb. 13, 2020 issued in U.S. Appl. No. 15/855,569.
U.S. Office Action dated Jun. 10, 2020 issued in U.S. Appl. No. 15/855,569.
U.S. Office Action issued in U.S. Appl. No. 17/090,750 dated Jan. 16, 2024.
U.S. Appl. No. 17/090,750, filed Nov. 5, 2020.

* cited by examiner

VACUUM COOKING APPLIANCE

CROSS-REFERENCE TO RELATED APPLICATIONS

This application is a Continuation Application of prior U.S. patent application Ser. No. 15/855,569 filed Dec. 27, 2017, which claims priority under 35 U.S.C. § 119 to Korean Application No. 10-2016-0180503 filed on Dec. 27, 2016, whose entire disclosures are hereby incorporated by reference.

BACKGROUND

1. Field

A vacuum cooking appliance is disclosed herein.

2. Background

In addition to cooking methods such as, for example, oven cooking, grilling, and steaming, using an open-type cooking appliance or a closed-type cooking appliance, new cooking methods have been developed. One cooking method is sous-vide cooking. Sous-vide cooking is a cooking method that may preserve nutrients, texture, and taste, by cooking under a vacuum. Sous-vide cooking was first designed in 1799 by Benjamin Thompson, Count Rumford, with later contributions by American and French engineers in the 1960s as a food preservation method, and was developed by Bruno Goussault after sous-vide cooking was used to cook foie gras by George Pralus in 1974. French "sous-vide" refers to a low-temperature vacuum cooking method, also known as "under vacuum" in English. Since 1970, sous-vide cooking has been used in some luxury restaurants in Europe, and around the world in restaurants and hotels, for example.

Sous-vide cooking is a method in which food contained in a sealed plastic bag is heated for a long time in low-temperature water that may be maintained in a range of about 50° C. to 60° C. Sous-vide cooking may maintain an original taste of a material to preserve all texture, flavor, and nutrients at its peak, and for example, keep a peak texture of food. Sous-vide cooking may be capable of preventing meat from being too tough due to protein modification when cooked at a high temperature to maintain softness and moistness of the meat, and may evenly heat an inside and an outside of the food cooked via sous-vide cooking.

In sous-vide cooking, it may be very important to constantly maintain a temperature of water or liquid that cooks the food for a long time, and to firmly seal the food to be cooked by packing the food in a vacuum state. However, as sous-vide cooking may take a long time for cooking food, for example, from 4 hours to 48 hours, and adjustments of a cooking temperature and a cooking time may be very difficult, a separate dedicated cooking appliance may be required for effective sous-vide cooking. In order to package food to be cooked in a vacuum state, a separate vacuum package machine may be required. That is, for effective sous-vide cooking, a separate dedicated cooking appliance for sous-vide cooking may be required, and it may be inconvenient to provide a separate vacuum package machine for packing food to be cooked in a vacuum state.

Further, when the separate dedicated cooking appliance for sous-vide cooking and the separate vacuum package machine are provided, it may be difficult to provide sufficient space for installing the separate dedicated cooking appliance and the separate vacuum package machine. When the separate dedicated cooking appliance and the separate vacuum package machine are respectively installed at positions separated from each other, it may be inconvenient to perform the vacuum packing, the sous-vide cooking, and cooking of other materials at different positions.

BRIEF DESCRIPTION OF THE DRAWINGS

The embodiments will be described in detail with reference to the following drawings in which like reference numerals refer to like elements, and wherein.

DETAILED DESCRIPTION

Figure 1:
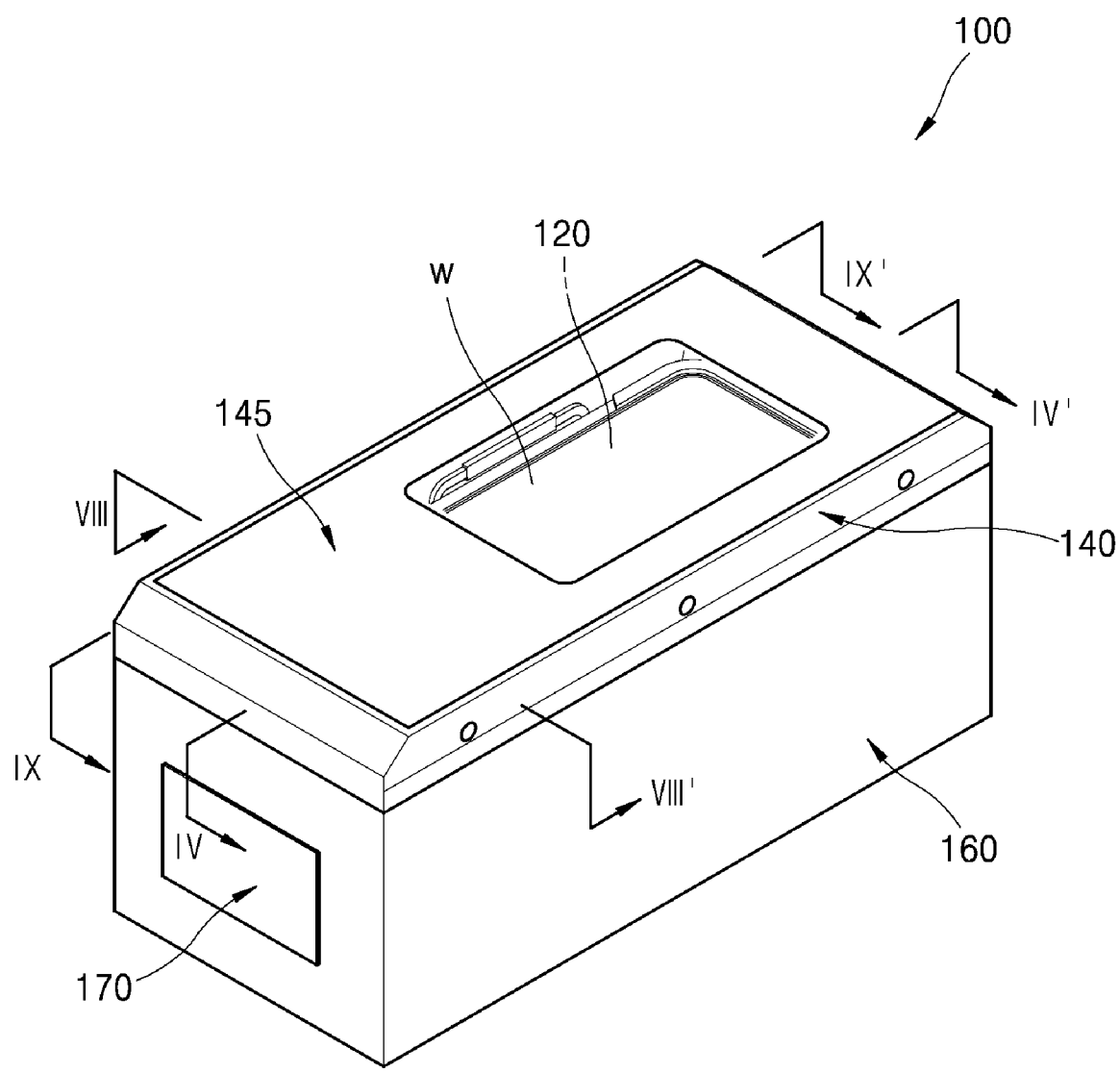
FIG. 1 is a perspective view of a vacuum cooking appliance according to an embodiment.

Referring to FIG. 1 to FIG. 4, a vacuum cooking appliance 100 according to an embodiment may include a housing 110, a second container 120, a heating part or heater 130, a cover mounting part or cover mount 140, a cover 145, and a vacuum packing module 150. The housing 110 may be in a form of a quadrangular frame in which a mounting hole 110a may be provided. Bent extensions 112 and 113 may be provided at an upper end edge of the housing 110 and may be formed to protrude outward from the housing 110 to form a coupling surface with the cover mount 140 at an upper end of the housing 110.

The bent extensions 112 and 113 may be formed to include a horizontally bent extension 112 bent outward to extend from the upper end of the housing 110, and a vertically bent extension 113 bent downward to extend from the horizontally bent extension 112. The bent extensions 112 and 113 may be formed across an entire upper end edge region or edge of the housing 110, which may include a container mount 111 as well as a vacuum packing module mount 115.

The container mount 111 and the vacuum packing module mount 115 may be provided at the housing 110. The container mount 111 may be provided at the housing 110 to allow a first container 114 and the second container 120 to be installed, and may correspond to a part or portion located at a rear side of the housing 110 when the housing 110 is divided along a frontward and rearward or first direction. The container mount 111 may be configured to include the mounting hole 110a and a frame enclosing the mounting hole 110a at an outer side thereof.

The first container 114 may be installed at or in the container mount 111. The first container 114 may be in a form of a box made of, for example, a metal material, in which an accommodating space may be formed and having an open upper portion. The first container 114 may correspond to a part or portion provided at the housing 110 to allow the second container 120 to be accommodated in the first container 114. The first container 114 may be in a form of a box having a hexahedral shape, in which a width may increase in an upward direction and an accommodating space may be formed inside the first container 114, and having an open upper surface.

The vacuum packing module mount 115 may correspond to a part or portion located in front of the housing 110 when the housing 110 is divided along the frontward and rearward or first direction. The vacuum packing module mount 115 may be formed to include the mounting hole 110a and the frame enclosing the mounting hole 110a at the outer side thereof, and to be connected to the container mount 111 to make a shape of a quadrangular frame. The vacuum packing module mount 115 may correspond to a part or portion provided at the housing 110 to allow the vacuum packing module 150 to be mounted on the vacuum packing module mount 115.

The vacuum packing module mount 115 may be formed in a shape of a polygonal frame that protrudes forward from the container mount 111, and a bottom surface of the vacuum packing module mount 115 may be formed to be located above a bottom surface of the first container 114. An electronic component space a may be formed below the vacuum packing module mount 115.

The above-described housing 110 including the container mount 111 and the vacuum packing module mount 115 may be formed to integrally connect the container mount 111 and the vacuum packing module mount 115. The second container 120 and the heating part 130 may be installed at the container mount 111, and the vacuum packing module 150 may be mounted on or at the vacuum packing module mount 115, and thus the vacuum cooking appliance 100 may be provided such that a configuration for cooking food or other items (hereinafter "food") at a low temperature and a configuration for vacuum packing the food may be integrally provided in a single appliance.

The second container 120 may be provided to accommodate thereinside a liquid, such as water, and may be provided to be withdrawn from the first container 114. As shown in FIG. 3 to FIG. 6, the second container 120 may be configured to include a container main body 121, a container cover 123, and a handle 125.

The container main body 121 may be in a form of a box, and may have an accommodating space formed inside the container main body 121 and an open upper portion. The second container 120 may have a form similar to that of the first container 114, but it may be a box having a hexahedral shape, which has a height less than a height of the first container 114. The container main body 121 may be formed of, for example, a metal material with high thermal conductivity.

The container cover 123 may be provided in a form of a quadrangular-shaped plate capable of covering the open upper portion of the container main body 121, and may be seated or placed on the second container 120 to cover an open upper portion thereof. The container cover 123 may block vapor, which may be generated when water or liquid inside the second container 120 is heated, from leaking out of the second container 120, block heat transmitted to the cover 145 to prevent the cover 145 from being overheated, and prevent the water or liquid from overflowing when the second container 120 is moved. A gasket g may be installed at an interface between the container cover 123 and the container main body 121 to improve a sealing force therebetween.

The handle 125 may be provided at a lateral portion of the container main body 121, and may be installed to be capable of vertically extending from and retracting into the lateral portion thereof. A flange may be formed to laterally protrude from an upper end portion or end of the container main body 121, and the handle 125 may be formed in a form of a ring to be vertically slidably coupled to the flange.

The handle 125 may be slidably coupled to the lateral portion of the container main body 121 so as to be changed to a hidden position (see FIG. 5) located inside the first container 114 to prevent the handle 125 from protruding out of the housing 110, and to a protruding position (see FIG. 6) at which the handle 125 protrudes out from the first container 114. A protuding degree of the handle 125 at the protruding position may be such that a user may be able to grip the handle 125 outside the first container 114 to lift the second container 120 mounted inside the first container 114.

When the handle 125 is installed at the container main body 121 instead of being installed at the container cover 123, there may not be a need to add a component, such as a buckle, to fix the container cover 123 to the container main body 121, so that a configuration of the second container 120 may be simplified. As the handle 125 is configured to vertically protrude and retract, a volume occupied by the handle 125 in the second container 120 may be reduced, and thus, a volume of the first container 114 required for being accommodated in the second container 120 may be reduced so that an entire size of the housing 110, the first container 114, and the cooking appliance including the housing 110 and the first container 114 may be reduced.

Referring to FIG. 1 to FIG. 4, the heating part 130 may be configured to be installed at the housing 110 to heat the liquid contained inside the second container 120. The heating part 130 may be provided as a low-temperature heater configured to heat the liquid contained inside the first container 114, that is, contained inside the second container 120 at a temperature of 100° C. or less.

The heating part 130 may include a plate-shaped electric heater 131 installed at a lower portion of the first container 114 so as to be located on a bottom surface of the second container 120 mounted inside the first container 114. The electric heater 131 may be in contact with a bottom surface of the container main body 121 and may heat water or liquid contained inside the second container 120. The heating part 130 may be implemented in various modifications in which the heating part 130 may be installed to be in contact with another portion in addition to the bottom surface of the container main body 121, may be provided in a form of a coil-shaped heater, and may include a heating device configured to heat the second container 120 by an induction heating method rather than the electric heater 131.

The heating part 130 may further include a temperature measurement part or sensor 133 and a temperature control part or controller 135. The temperature sensor 133 may sense a temperature of the second container 120 heated by the electric heater 131 or a temperature of the water or liquid accommodated inside the second container 120. The temperature controller 135 may control an operation of the electric heater 131 to maintain the temperature of the second container 120 or the temperature of the water or liquid accommodated inside the second container 120 at a predetermined temperature. The temperature sensor 133 may include a thermistor, and the temperature controller 135 may include a thermostat.

The cover mount 140 may be in a form of a quadrangular frame with a shape corresponding to a shape of an upper end edge of the housing 110 and may be installed at an upper portion thereof. An opening hole 141 may be formed to pass through the cover mount 140 and may be configured to open upward the second container 120, which may be accommodated in the first container 114, and the vacuum packing module 150.

The cover mount 140 may be coupled to the bent extensions 112 and 113, which may be formed at the upper end edge of the housing 110, and installed at the upper portion of the housing 110. The cover mount 140 may correspond to a coupling medium configured to couple the cover 145 to the upper portion of the housing 110.

The cover 145 may be installed at the cover mount 140 to open and close the opening hole 141. The cover 145 may include a cover glass 146 and a cover plate 147. The cover glass 146 may be in a form of a quadrangular-shaped plate capable of covering the opening hole 141, and may be formed of, for example, a transparent or semitransparent glass or plastic material, for example. The cover plate 147 may be in a form of a quadrangular-shaped plate corresponding to the shape of the cover glass 146, and may be coupled to a lower portion of the cover glass 146 to support the cover glass 146. A viewing window w may be formed to vertically pass through an inside of the cover plate 147, and an internal state of the vacuum cooking appliance 100 covered by the cover 145 may be viewed from an outside through such a viewing window w.

One or a first end portion or end of the cover 145 may be pivotably coupled to the cover mount 140, and the cover 145 may be pivoted based on the one end portion pivotably coupled to the cover mount 140 to open and close the opening hole 141. For example, the one end portion of the cover 145 may be vertically pivotably coupled to a hinge 149 installed at the cover mount 140, and the cover 145 may be vertically pivoted based on the one end portion to open and close the opening hole 141.

A hook h may be provided to protrude from another or second end portion or end of the cover 145 opposite to the one end portion of the cover 145 to fix the other end portion of the cover 145 to the housing 110 or the cover mount 140. A latch mechanism or latch r may be provided at a portion of the housing 110 or the cover mount 140, which corresponds to the hook h, and may be detachably coupled to the hook h. A mechanism that allows the hook h and the latch mechanism r to be sequentially engaged with and disengaged from each other by a pressing operation to the other end portion of the cover 145 at which the hook h is installed, may be applied as the latch mechanism r. Consequently, the cover 145 may be pivoted based on the one end portion thereof pivotably coupled to the hinge 149 to open and close the opening hole 141, while the other end portion of the cover 145 may be fixed to the housing 110 or the mount 140 as needed through coupling of the hook h and the latch mechanism r such that a closed state of the cover 145 may be stably maintained.

By opening and closing operations performed by the cover 145, the second cover 120 and the vacuum packing module 150, which may be mounted on the housing 110, may be exposed to the outside or may be covered with the cover 145. A gasket g may be installed at an interface between the cover 145 and the cover mount 140 to improve a sealing force therebetween.

The cover 145 may be divided into a pressurizing region 145a and a covering region 145b. The pressurizing region 145a may be a region facing the vacuum packing module 150 when the cover 145 closes the opening hole 141, and may correspond to a region at which the cover 145 covers and pressurizes the vacuum packing module 150 from above. The covering region 145b may be a region facing the first container 114 and the second container 120 when the cover 145 closes the opening hole 141, and may correspond to a region at which the cover 145 covers an open upper portion of the first container 114.

Figure 2:
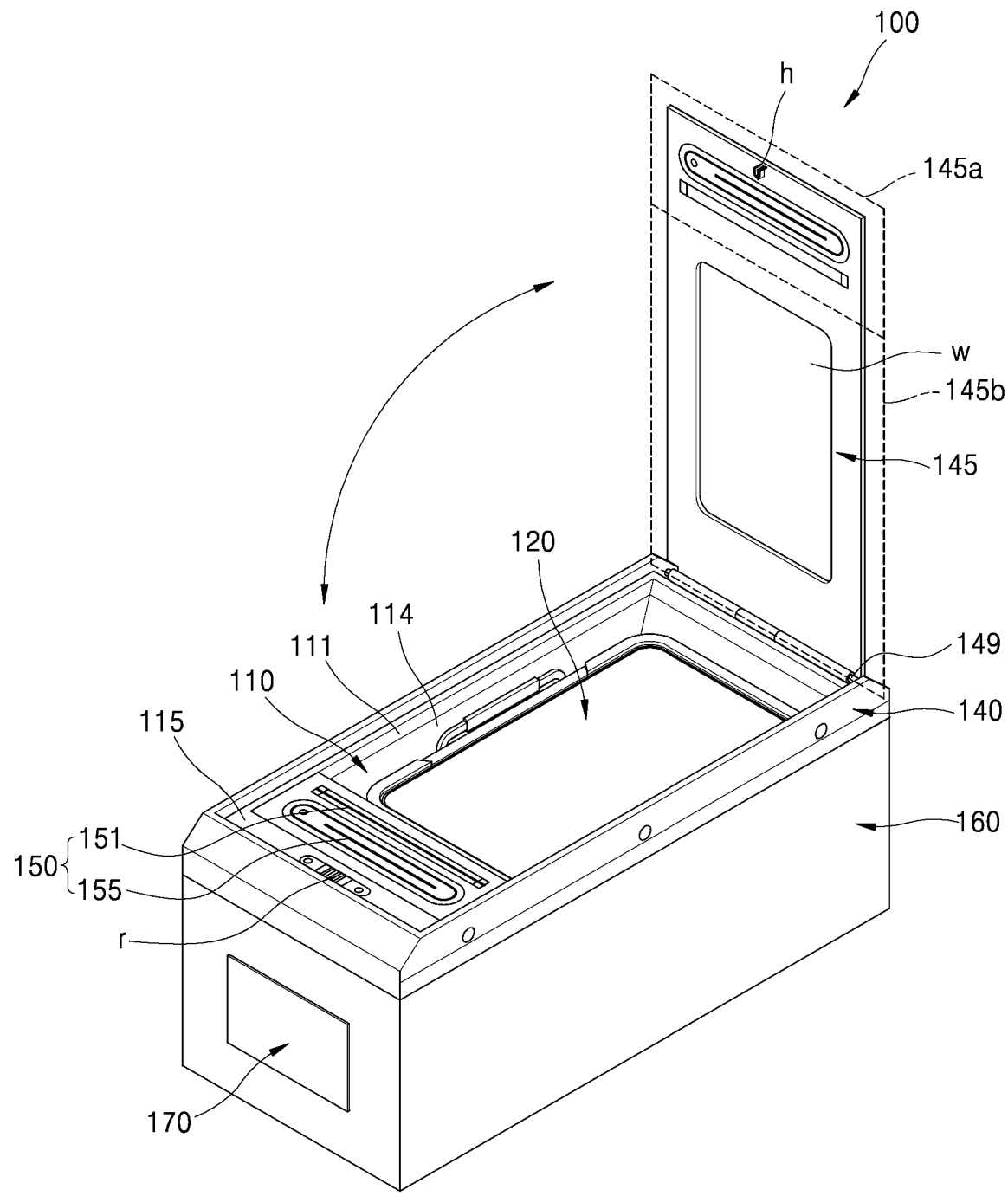
FIG. 2 is a perspective view of an open state of a cover of the vacuum cooking appliance.
Figure 3:
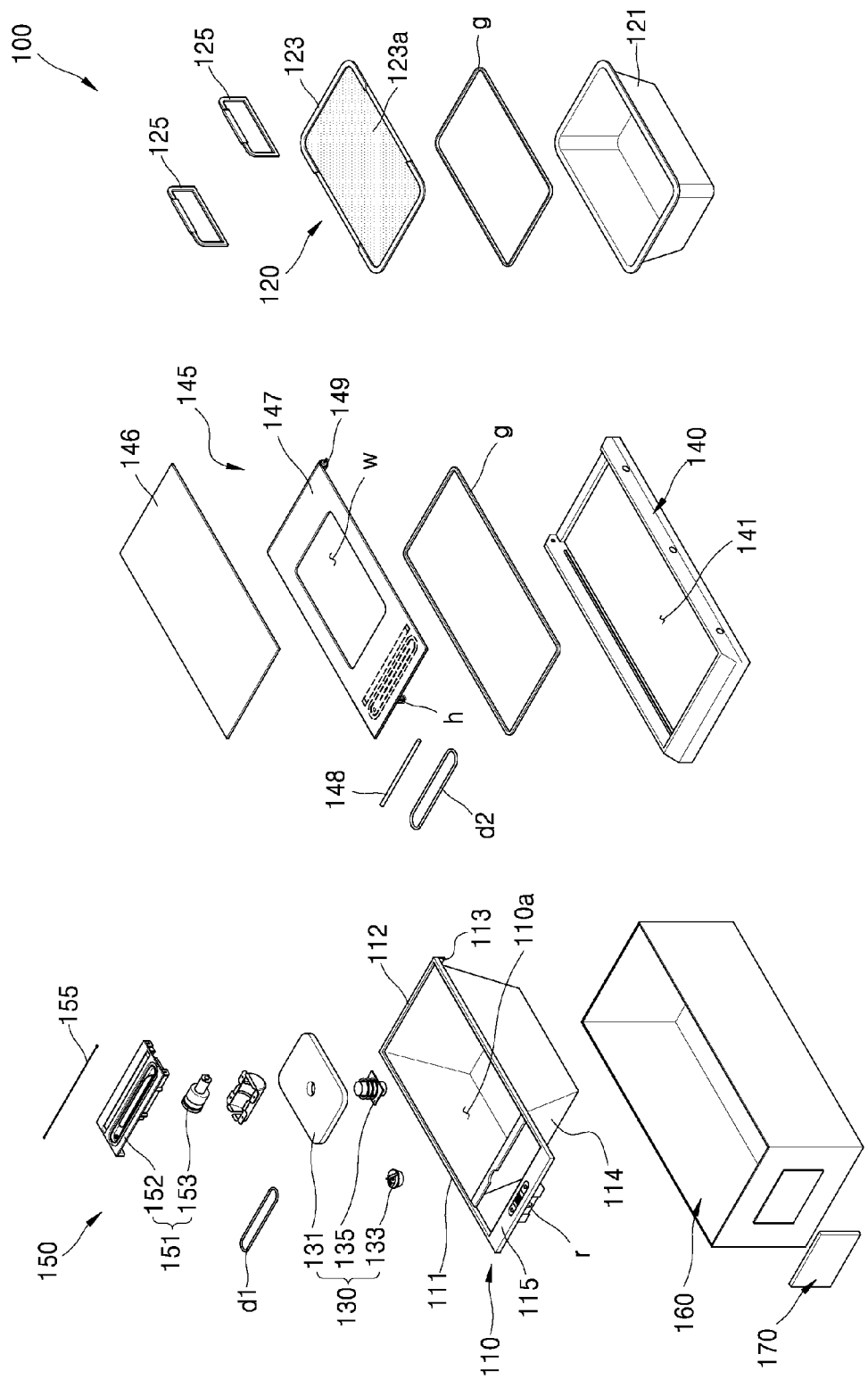
FIG. 3 is an exploded perspective view of disassembled components of the vacuum cooking appliance.
Figure 4:
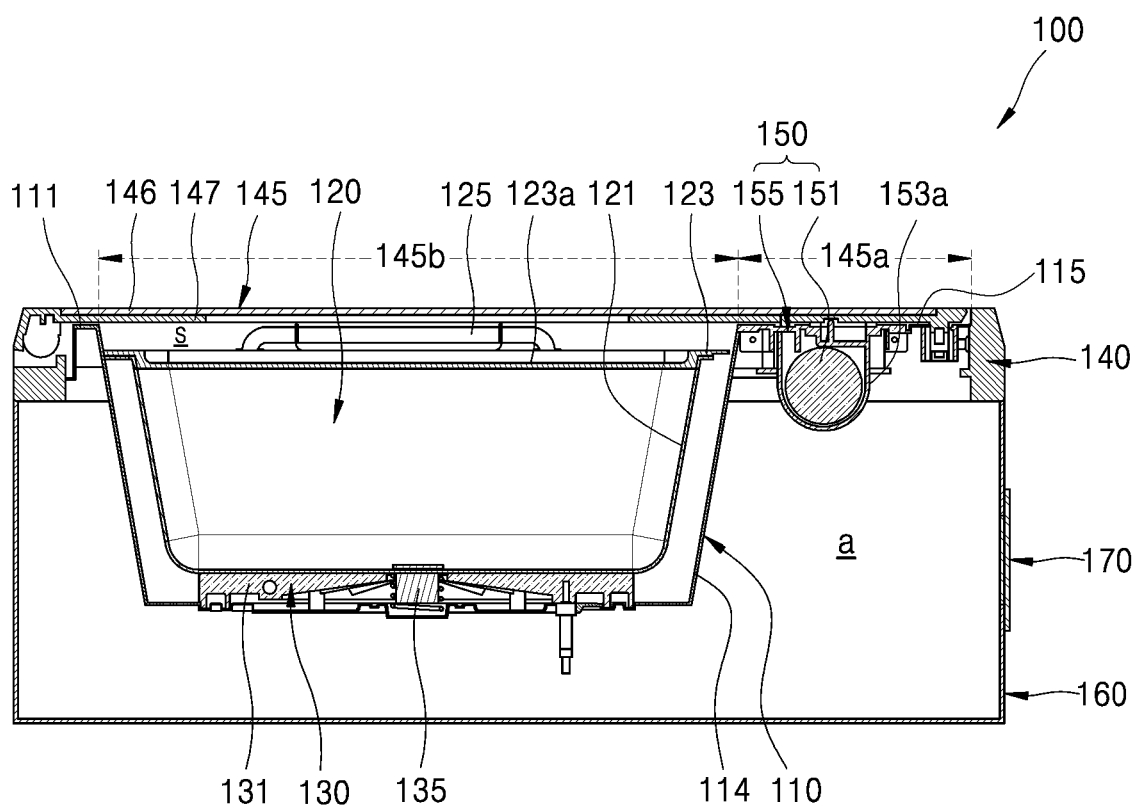
FIG. 4 is a cross-sectional view taken along line IV-IV' of FIG. 1.
Figure 5:
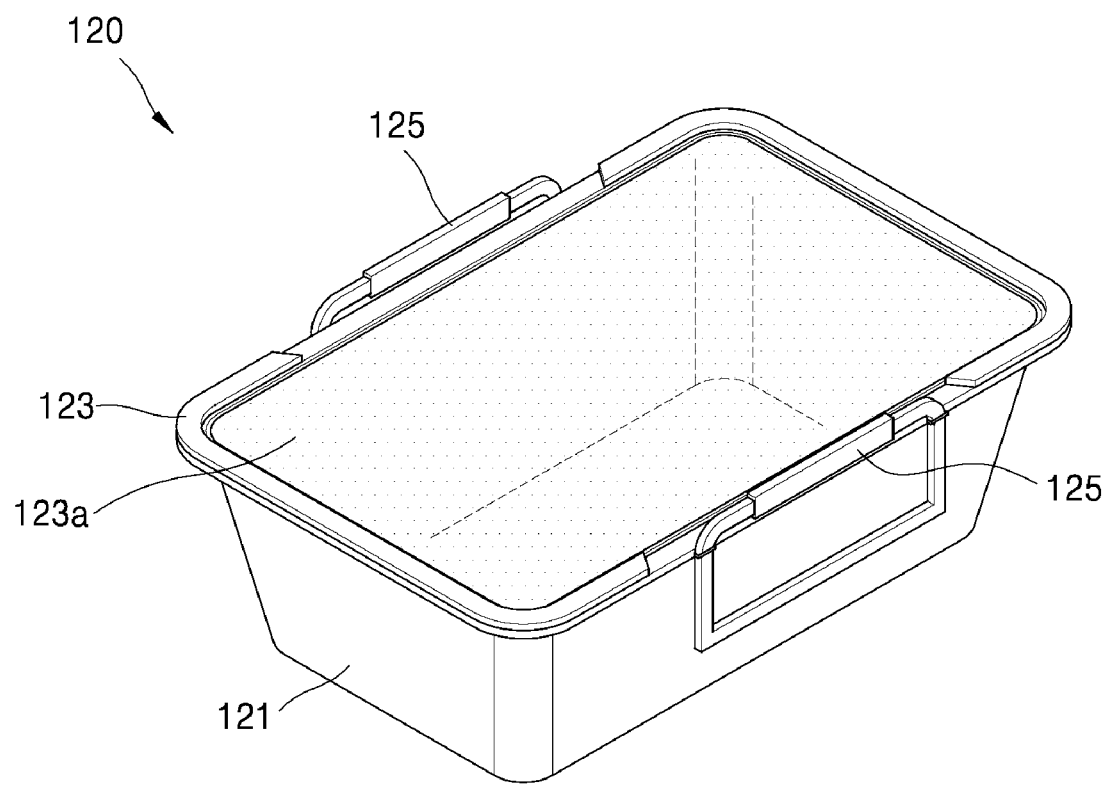
FIG. 5 is a perspective view of a container according to an embodiment.
Figure 6:
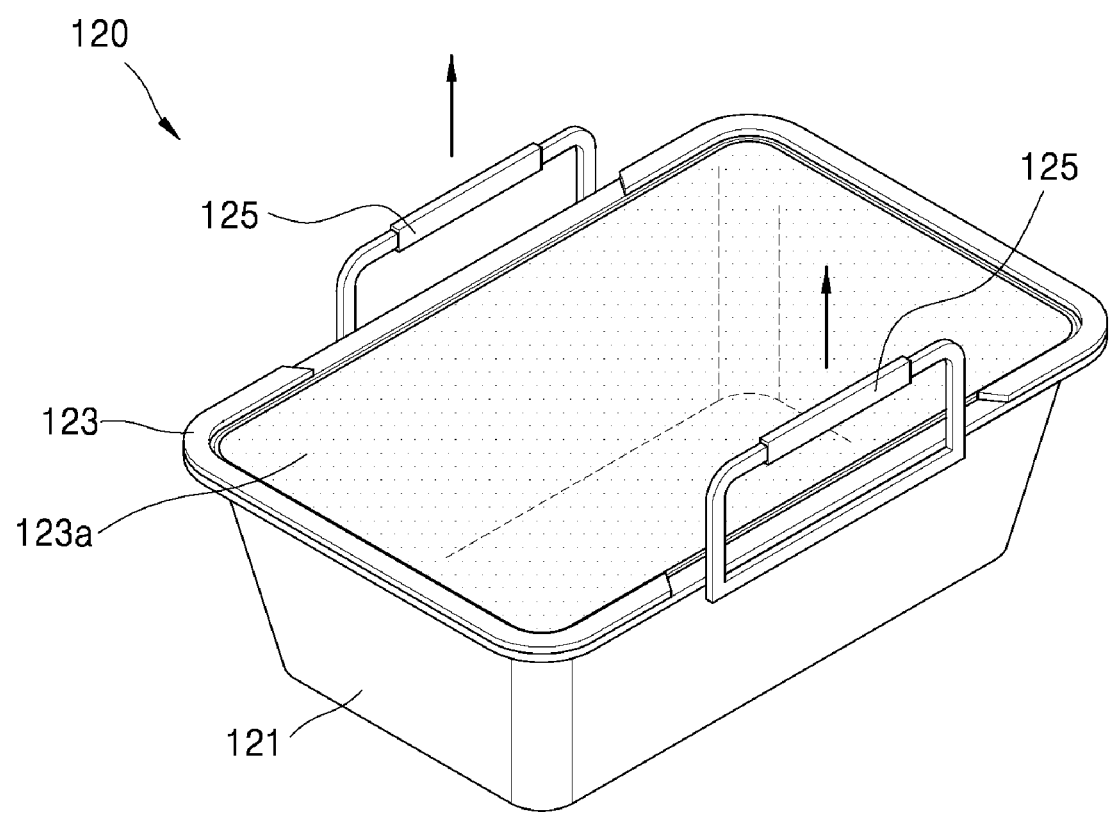
FIG. 6 is a perspective view of a protruded state of a handle of the container shown in FIG. 5.
Figure 7:
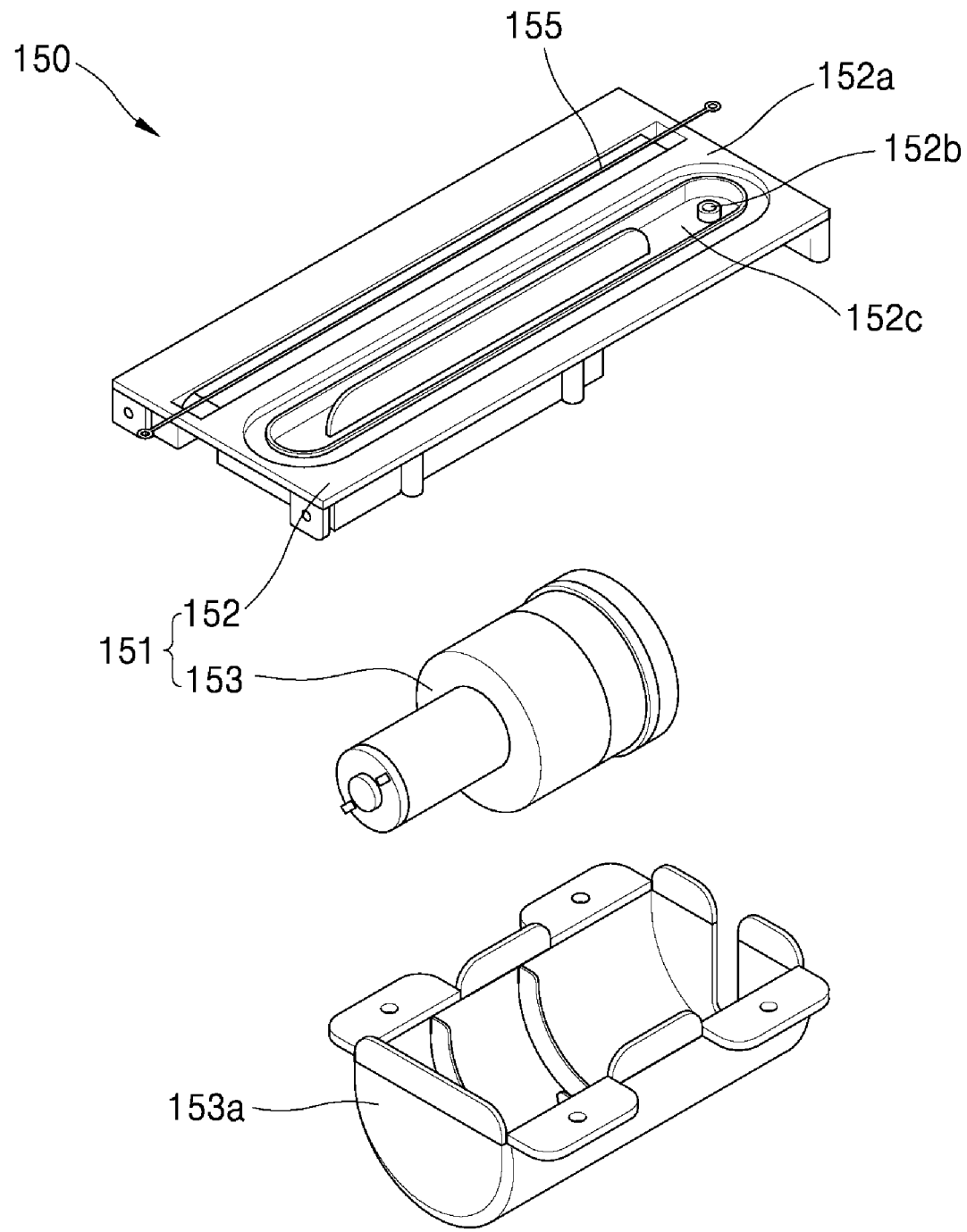
FIG. 7 is an exploded perspective view of components of a vacuum packing module according to an embodiment.
Figure 8:
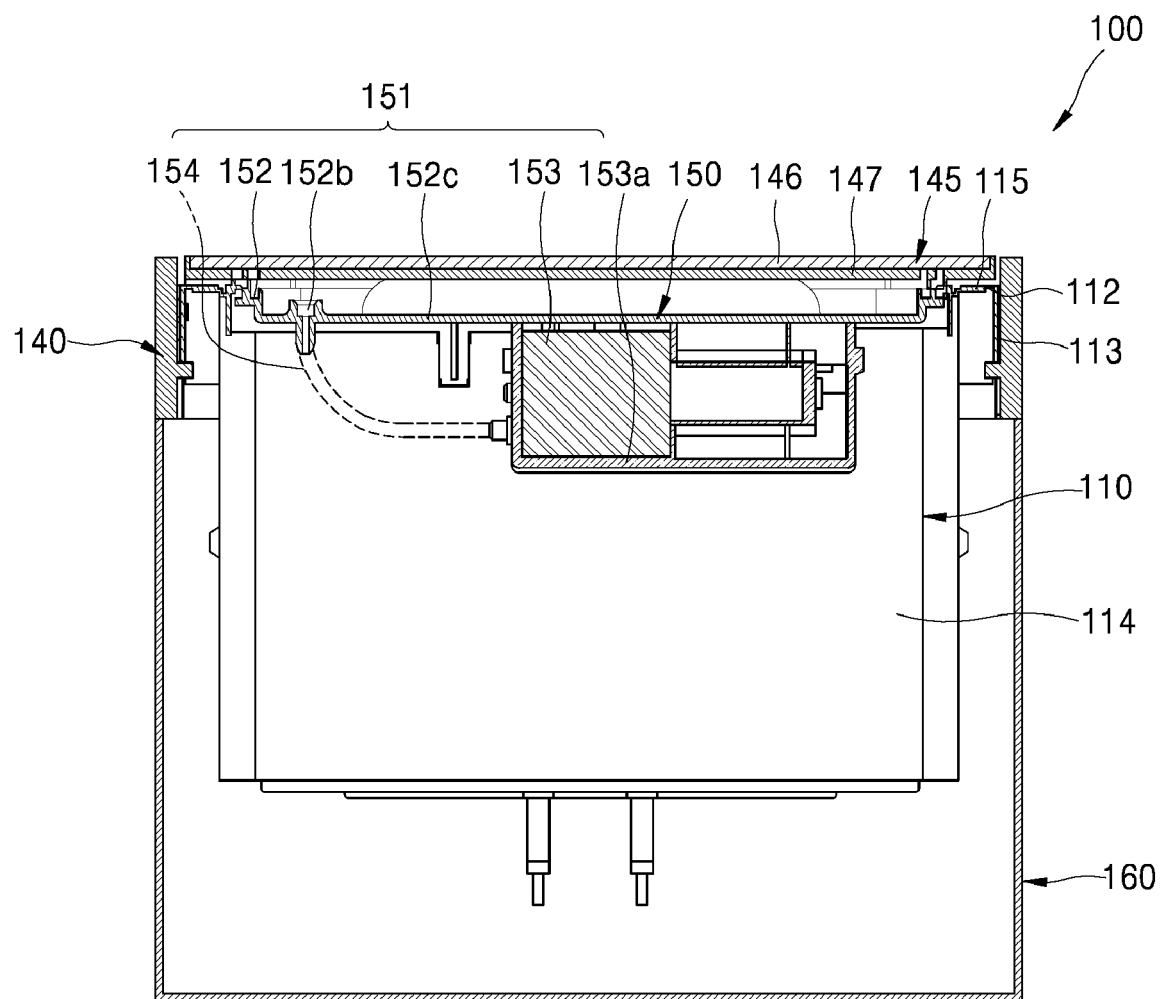
FIG. 8 is a cross-sectional view taken along line VIII-VIII' of FIG. 1.

Referring to FIG. 2 to FIG. 4, the vacuum packing module 150 may be installed at or in the vacuum packing module mount 115. The vacuum packing module 150 may be configured to include a vacuum pressure generator 151 configured to generate a vacuum pressure that forms a vacuum inside a food packing container or bag p, and a sealer 155 configured to generate heat to seal an open inlet side or opening of the food packing container p. The food packing container p may be a packing material made of, for example, a vinyl material, in which a space for accommodating food is formed and an open inlet or opening is formed.

The vacuum pressure generator 151 may form a vacuum inside the food packing container p, and as shown in FIG. 7 to FIG. 10, the vacuum pressure generator 151 may include a vacuum panel 152 and a vacuum pump 153. The vacuum panel 152 may provide a frame at which various components of the vacuum packing module 150 may be installed, and a supporting surface 152a configured to support some of the food packing container p from below. The vacuum panel 152 may be in a form of a quadrangular-shaped plate capable of covering the penetrating inside of the vacuum packing module mount 115, and an air inlet 152b and a packing bag insertion part or portion 152c may be formed at the vacuum panel 152.

The air inlet 152b may be formed to pass through the vacuum panel 152. A protrusion that protrudes downward to enclose the air inlet 152b may be formed on a lower surface of the vacuum panel 152, at which the air inlet 152b is formed, and the protrusion may be a portion to which a connecting hose 154 configured to connect the vacuum pump 153 to the air inlet 152b may be coupled.

The packing bag insertion part 152c may be configured as a concave surface into which the open inlet side of the food packing container p is inserted. The packing bag insertion part 152c may be concave downward from the supporting surface 152a. Consequently, an insertion space enclosed by a side surface, which connects between the packing bag insertion part 152c and the supporting surface 152a, may be formed and the open inlet side of the food packing container p may be inserted into the insertion space. The air inlet 152b may be formed to pass through the packing bag insertion part 152c and may be located inside the insertion space.

The vacuum pump 153 may be provided to generate a vacuum pressure acting on the air inlet 152b and may be installed and positioned below the vacuum panel 152. If the vacuum pump 153 is accommodated inside a pump case 153a provided and coupled to a lower portion of the vacuum panel 152, the pump case 153a may be coupled to the lower portion of the vacuum panel 152 so that the vacuum pump 153 may be installed. The vacuum pump 153 may be connected to the air inlet 152b through the connecting hose 154, and the vacuum pressure generated by an operation of the vacuum pump 153 may act through the air inlet 152b connected to the connecting hose 154.

A first seal d1 may be installed at the vacuum panel 152 at which the vacuum pump 153 is installed to enclose a periphery of the packing bag insertion part 152c. The first seal d1 may be formed in a closed curve shape enclosing the packing bag insertion part 152c and the air inlet 152b formed at the packing bag insertion part 152c. A second seal d2, which may be in a shape corresponding to a shape of the first seal d1, may be installed at the pressurizing region 145a of the cover 145. The second seal d2 may engage with the first seal d1 when the opening hole 141 is closed by the cover 145 to seal the insertion space inside the packing bag insertion part 152c.

At least one of the first seal d1 or the second seal d2 may be made of, for example, a buffer material, and the insertion space inside the packing bag insertion part 152c may be sealed by engagement between the first seal d1 and the second seal d2. Accordingly, the vacuum pressure acting through the air inlet 152b may fully act on the inlet side of the food packing container p accommodated in the insertion space.

The sealer 155 may generate heat to seal the open inlet side of the food packing container p and may be configured to include a hot wire configured to generate heat using a current. The hot wire of the sealer 155 may be in a straight line in parallel to the packing bag insertion part 152c provided at the vacuum panel 152, may have a length corresponding to a length of the packing bag insertion part 152c, and may be spaced apart by a predetermined interval from the packing bag insertion part 152c in the frontward and rearward or first direction. The hot wire may be installed at the supporting surface 152a of the vacuum panel 152 and may be exposed above the vacuum panel 152. The hot wire of the sealer 155 may be provided between the packing bag insertion part 152c of the vacuum pressure generator 151 and the first container 114.

A pressurizing member 148 may be provided at the pressurizing region 145a of the cover 145. The pressurizing member 148 may be in contact with the hot wire of the sealer 155 when the cover 145 closes the opening hole 141, and may be in a form of a pad made of, for example, a buffer material, which may have a width that is greater than a width of the hot wire of the sealer 155. The pressurizing member 148 may pressurize the inlet side of the food packing container p in a direction immediately close to the hot wire of the sealer 155 such that the sealing of the food packing container p by the hot wire may be more effectively performed.

When the cover 145 closes the opening hole 141, the pressurizing region 145a of the cover 145, at which the first seal d1 and the pressurizing member 148 may be installed, may cover an upper portion of the vacuum packing module 150, and may cover the vacuum pressure generator 151 and the sealer 155 of the vacuum packing module 150 to allow the first seal d1 to be engaged with the second seal d2 and to allow the pressurizing member 148 to be in contact with the hot wire of the sealer 155.

When the pressurizing region 145a covers the vacuum pressure generator 151 and the sealer 155 of the vacuum packing module 150, the inlet side of the food packing container p may be fixed in a sealed space formed by the first seal d1 and the second seal d2 and may be pressed to the hot wire of the sealer 155 by the pressurizing member 148 to be in close contact with the hot wire of the sealer 155.

Figure 9:
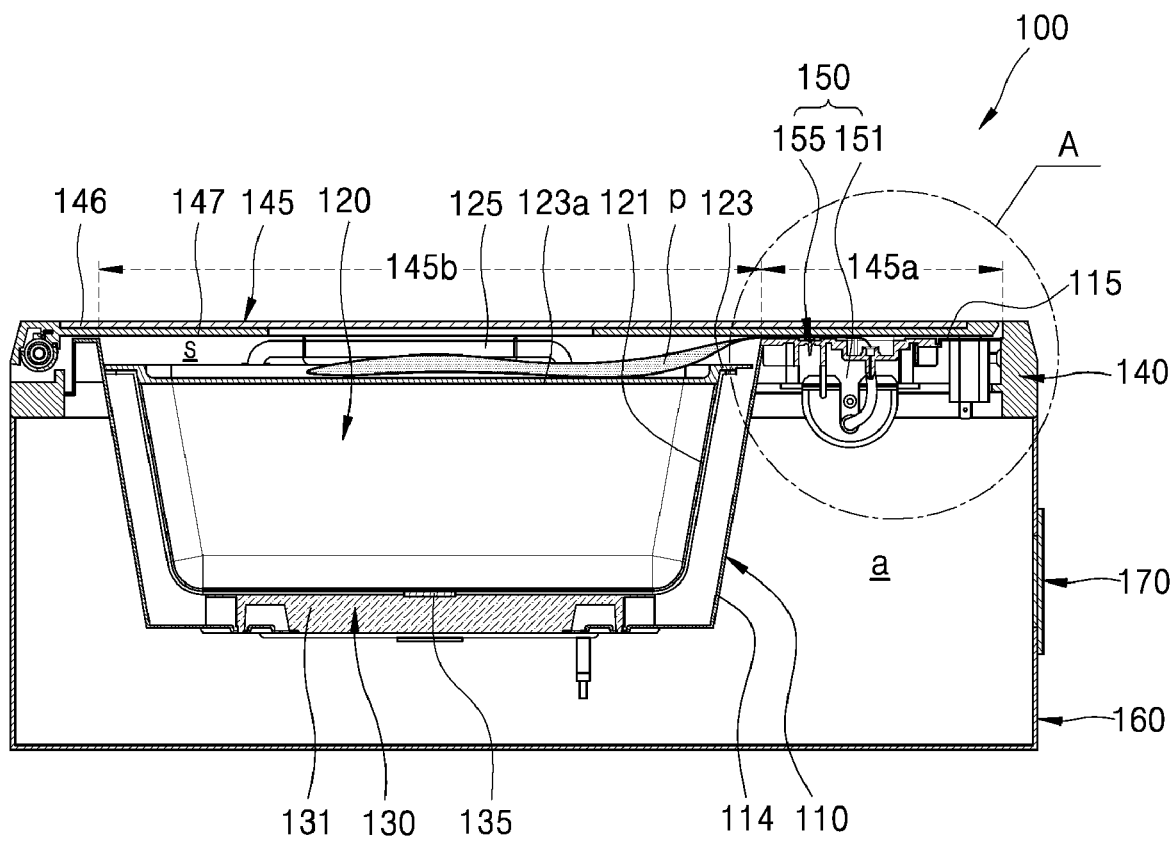
FIG. 9 is a cross-sectional view taken along line IX-IX' of FIG. 1.
Figure 10:
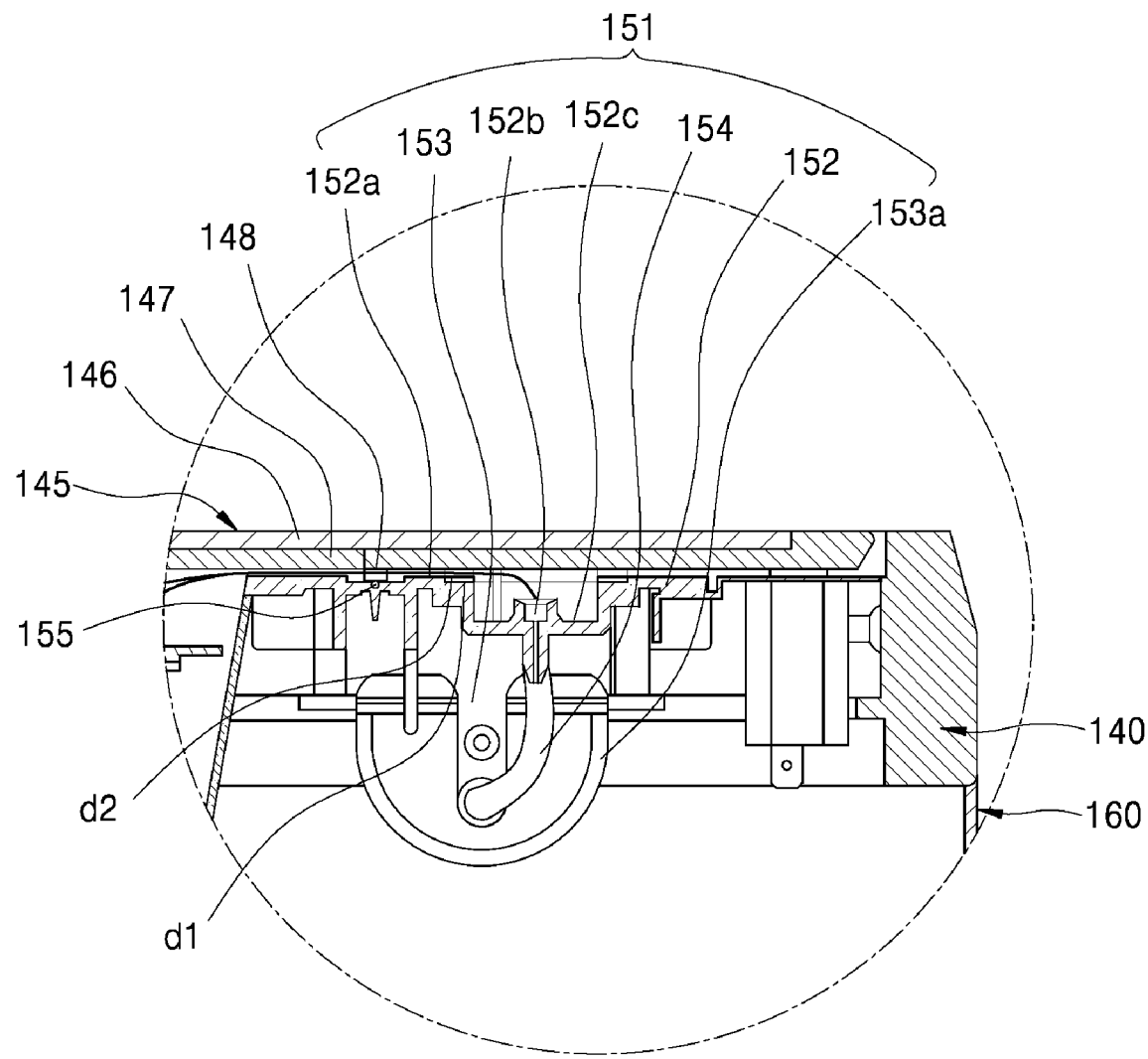
FIG. 10 is an enlarged view of Portion A of FIG. 9.

Referring to FIG. 9, the container cover 123 of the second container 120 mounted on the first container 114 may be provided such that a seating surface or seat 123a may be formed on an upper surface of the container cover 123. The seating surface 123a may be recessed downward from an edge of the container cover 123 to form a plane located below a plane formed by the supporting surface 152a of the vacuum panel 152 and a plane formed by the packing bag insertion part 152c.

The seating surfurce 123a may form a plane on which a remaining portion of the food packing container p, for example, a portion in which a cooking material is accommodated may be seated. The seating surface 123a may form a plane located below the plane formed by the supporting surface 152a of the vacuum panel 152 and the plane formed by the packing bag insertion part 152c, and spaced apart downward by a predetermined interval from a plane formed by the covering region 145b of the cover 145 when closing the opening hole 141. Consequently, a packing bag accommodating space s in which the food packing container p may be accommodated may be formed between the covering region 145b of the cover 145 when closing the opening hole 141 and the seating surface 123a.

Referring to FIG. 1 to FIG. 4, the vacuum cooking appliance 100 may further include an outer case 160 and a control panel 170. The outer case 160 may be provided to form an exterior appearance of the vacuum cooking appliance 100 in addition to the cover mount 140 and the cover 145. The outer case 160 may be coupled outside the housing 110 to accommodate the housing 110 therein, and an accommodating space that accommodates the housing 110 and the electronic component space a may be formed inside the outer case 160.

The outer case 160 may be in a form of a box having a hexahedral shape, in which the accommodating space may be formed and having an open upper surface. An upper end edge of the outer case 160 may be coupled to the bent extensions 112 and 113 of the housing 110 to be engaged with the housing 110, or may be coupled to a lower end edge of the cover mount 140 to be engaged with the housing 110 through coupling to the cover mount 140.

The vacuum packing module mount 115 of the housing 110 may be formed and provided at a position that protrudes forward from the container mount 111 and the first container 114, and may be formed to have a lower surface of the vacuum packing module mount 115 above a lower surface of the first container 114. The electronic component space a may be formed below the vacuum packing module mount 115. The electronic component space a may be a region located in front of the container mount 111 and the first container 114, and may be configured to include a region located below the vacuum packing module 150 mounted on the vacuum packing module mount 115.

The outer case 160 may form an accommodating space for the housing 110, the first container 114, and the electronic component space a, and an outer boundary surface of the electronic component space a may be defined by the outer case 160. That is, the electronic component space a may be configured with a space with which an upper boundary surface is defined by the vacuum packing module 150, one lateral boundary surface is defined by the first container 114, and a lower boundary surface and remaining three lateral boundary surfaces may be defined by the outer case 160.

The first container 114 may have a shape with a length that is greater than a vertical length of the second container 120 so as to accommodate the second container 120, so that each of the vacuum packing module mount 115 and the vacuum packing module 150 may not need to be installed to have a vertical length the same as that of the first container 114. Therefore, an available space in which a component directly related to the vacuum packing module 150 is not provided may be secured in a lower region of a portion at which the vacuum packing module mount 115 and the vacuum packing module 150 are provided, and thus, a space secured at a front side position inside the outer case 160 may correspond to the electronic component space a.

The electronic component space a may accommodate an electronic component installed in connection with an operation of the heating part 130, an electronic component installed in connection with an operation of the vacuum packing module 150, an electronic component installed in connection with an operation of the control panel 170, electronic components related to a connection of the above-described components, and electronic components related to a supply of electricity to the above-described components. Also, a component, such as a cooling fan, may be installed in the electronic component space a to cool the above-described electronic components installed in the electronic component space a.

The control panel 170 may be provided on a front surface of the vacuum cooking appliance 100. The control panel 170 may be in a hexahedral shape having a predetermined internal space, and an input unit or input, to which a user may input a manipulation signal to operate the heating part 130 and the vacuum packing module 150, may be provided on a front surface of the control panel 170.

A plurality of manipulation switches may be provided at the input, and the user may directly input the manipulation signal through the plurality of manipulation switches. A display may be provided at the control panel 170 to provide operation information of the vacuum cooking appliance 100, and the user may determine various information regarding the vacuum cooking appliance 100 through the display.

The control panel 170 may be installed at the outer case 160 and may be installed on the front surface of the outer case 160 adjacent to the electronic component space a. The control panel 170 may be installed at the front surface adjacent to the electronic component space a, so that the various electronic components installed in the electronic component space a and the control panel 170 may be efficiently connected, and a connection line for such a connection may be configured more simply.

Referring to FIG. 1 to FIG. 4, the vacuum cooking appliance 100 may be provided such that a configuration for vacuum packing the food packing container p and a configuration for heating the vacuum packaged food may be included together in a single appliance having an exterior shape defined by the cover 145, the cover mount 140, and the outer case 160.

The vacuum cooking appliance 100 as described above may be used in the following manner. First, as shown in FIG. 2 and FIG. 4, the cover 145 may be pivoted to open the inside of the vacuum cooking appliance 100, and then water or liquid required for cooking may be filled inside the second container 120. The water or liquid may be filled inside the second container 120 in a state in which the second container 120 is taken out from the first container 114 or in a state in which the second container 120 is mounted on the first container 114. After the water or liquid required for cooking is filled inside the second container 120, the container cover 123 may be placed on the upper portion of the container main body 121.

When food has been vacuum packed, it may be cooked by being put into the second container 120 before covering the container cover 123, but, when a vacuum packing is required for the food, vacuum packing may be performed using the vacuum packing module 150. The vacuum packing operation using the vacuum packing module 150 may be performed as follows.

First, after the food is placed inside the food packing container p, the food packing container p may be provided to allow the open inlet side of the food packing container p to be located at the vacuum packing module 150, so that the food packing container p may be prepared for a vacuum packing.

An end portion or end of the open inlet side of the food packing container p may be inserted into the packing bag insertion part 152c, and a lateral surface of the inlet side of the food packing container p, which may be located outside the packing bag insertion part 152c, may be provided above the supporting surface 152a of the vacuum panel 152 and the hot wire of the sealer 155. Further, the remaining portion of the food packing container p may be placed and located on the second container 120, that is, the remaining portion may be placed and seated on the seating surface 123a formed at an upper portion of the container cover 123.

Accordingly, the food packing container p to be vacuum packed may be first placed on the seating surface 123a formed on the upper portion of the container cover 123, and may be provided at a convenient position for a vacuum packing in a stable state. Then the end portion of the open inlet side of the food packing container p may be inserted into the packing bag insertion part 152c, so that the packing bag insertion part 152c may be prepared. A seated portion of the seating surface 123a of the food packing container p may be stably accommodated in the packing bag accommodating space s inside the first container 114 in a form in which a lower portion of the food packing container p is supported by the seating surface 123a and a lateral portion thereof is enclosed by the first container 114.

When the food packing container p is vacuum packed, a supporting surface may be insufficient to seat another portion located outside the vacuum packing machine except for a portion located inside the vacuum packing machine, and thus, it may be inconvenient as the user may need to hold the food packing container p to prevent contents inside the food packing container p from leaking out until the operation of the vacuum packing is completed. For example, as the user may need to use the vacuum packing machine with one hand, the food packing container p may be held by one hand, and thus, operation of the vacuum packing may be performed in an unstable state.

On the other hand, in the vacuum cooking appliance 100, a support structure may be provided to be able to seat most of the food packing container p located outside the vacuum packing module 150 on the seating surface 123a formed at the upper portion of the second container 120, as described above. That is, the food packing container p to be vacuum packed may first be placed on the seating surface 123a formed at the upper portion of the container cover 123, and may be located at a convenient position for vacuum packing in a stable state, and then the end portion of the open inlet side of the food packing container p may be inserted into the packing bag insertion part 152c, so that the packing bag insertion part 152c may be prepared for vacuum packing.

The seating surface 123a on which the food packing container p is seated may form a plane located below the plane formed by the packing bag insertion part 152c into which the inlet side of the food packing container p is inserted, so that the food packing container p may be seated to locate the open inlet side thereof at a position above the remaining portion of the food packing container p which is seated on the second container 120. Consequently, even in a state in which the user does not directly hold the food packing container p, the food packing container p may remain in a stable state so as to prevent the food inside the food packing container p from leaking out and may be prepared in the vacuum cooking appliance 100.

As described above, when preparation of the food packing container p for the vacuum packing is completed, the cover 145 may be closed to press the food packing container p between the vacuum panel 152 and the cover 145. Due to the shape of the seating surface 123a formed to be recessed downward, the packing bag accommodating space s may be formed between the covering region 145b of the cover 145 and the seating surface 123a of the container cover 123, so that, even when the cover 145 is closed, the portion seated on the seating surface 123a may be stably accommodated in the packing bag accommodating space s without being pressed by the cover 145.

When the cover 145 is closed and then the vacuum pump 153 is operated, a vacuum pressure may act on the inside of the packing bag insertion part 152c, and the inside of the food packing container p may be changed to a vacuum state by the vacuum pressure. Then, when the sealer 155 is operated to perform a sealing operation in a state in which the operation of the vacuum packing for the food packing container p is completed, the food packing container p may be sealed in a vacuum state, and thus, the operation of the vacuum packing for the food packing container p may be completed.

The hot wire of the sealer 155 that performs the sealing operation on the food packing container p may be provided and located between the packing bag insertion part 152c and the first container 114, that is, between the packing bag insertion part 152c and the seating surface 123a. A configuration for sealing the food packing container p may be provided between a position at which a configuration for vacuum suctioning the inside of the food packing container p and a position at which the food packing container p is seated and supported.

Accordingly, when the food packing container p to be vacuum packaged is stably seated on the seating surface 123a formed at the upper portion of the container cover 123, the vacuum operation by the vacuum pressure generator 151 may be stably performed as well as the sealing operation by the sealer 155 may also be effectively performed in the same state.

The operation of the vacuum cooking appliance 100 as described above may correspond to a synergistic effect achieved by combining the configuration for vacuum packing the food packing container p and the configuration for heating a vacuum packaged cooking material into a single appliance. That is, the vacuum packing module 150, which is the configuration for vacuum packing the food packing container p, and the second container 120, which is the configuration for heating the vacuum packaged cooking material, may be respectively provided at adjacent positions and may be a single appliance, and thus, a structure for stably supporting the food packing container p may be provided by the second container 120, so that the operation of the vacuum packing may be conveniently stably performed while the food packing container p is maintained in a stable state so as to prevent the food from leaking out even if the user does not directly hold the food packing container p.

After the operation of the vacuum packing by the vacuum packing module 150 is completed, the container cover 123 may be opened and the vacuum packaged food may be put into the second container 120, when the cover 145 is open. Then, after the container cover 123 and the cover 145 are closed, the heating part 130 may be operated to heat the vacuum packaged food so that low-temperature cooking for food is performed. The container cover 123 covering the container main body 121 may block vapor generated when the water inside the second container 120 is heated, from leaking out of the second container 120, and may block heat from being transmitted to the cover 145, thereby serving to prevent overheating of the cover 145.

The operation of the heating part 130 may be initiated when the user manipulates the input of the control panel 170 to input a heating temperature and an operation signal, and thus, the low-temperature cooking for the food may be performed such that the electric heater 131 of the heating part 130 heats the water inside the second container 120 according to the input heating temperature.

According to the vacuum cooking appliance 100, electric and electronic components, such as, for example, electronic components installed in connection with the operation of the heating part 130, electronic components installed in connection with the operation of the vacuum packing module 150, electronic components installed in connection with the operation of the control panel 170, electronic components related to a connection of the above-described electronic components, and electronic components in connection with a supply of electricity to the above-described electronic components, may be installed and accommodated in the electronic component space a inside the outer casing 160.

The electronic component space a is configured with a space with which the upper boundary surface may be defined by the vacuum packing module 150, the one lateral boundary surface may be defined by the first container 114, and the lower boundary surface and the remaining three lateral boundary surfaces may be defined by the outer case 160. The electronic component space a may be a space that may be secured due to the configuration for vacuum packing the food packing container p and the configuration for heating the vacuum packaged cooking material being integrally included in a single appliance.

That is, the electronic component space a may be a space formed by adjacently mounting the vacuum packing module 150 having a relatively short vertical length in front of the first container 114 provided to have a relatively long vertical length, so that the electronic component space a may be a space that may be specifically secured only inside the vacuum cooking appliance 100.

When an appliance configured to vacuum package the food packing container p and an appliance configured to heat the vacuum packaged cooking material are separately configured, a space required for electric and electronic components may need to be secured in each appliance. When considering an entire exterior appearance of each appliance, in order to secure the space required for installing the electric and electronic components in each appliance, a size of each appliance may become larger than necessary.

On the other hand, in the vacuum cooking appliance 100, installation of electric and electronic components required for the configuration for vacuum packing and the configuration for heating the vacuum-packed cooking material may be in the electronic component space a that is a single integrated space, and the electronic component space a may be a space that may be naturally secured as the configurations for implementing different functions are installed in a single appliance. Thus, the vacuum cooking appliance 100 may have a compact size and an aesthetically simple beauty when compared with a case in which these configurations are respectively configured with separate appliances.

The vacuum cooking appliance 100 as described above may perform low-temperature cooking, such as sous-vide cooking. The operation of the vacuum packing required for the operation of the low-temperature cooking with a single appliance without separately providing separate dedicated cooking appliances for the sous-vide cooking and the separate vacuum package machine, so that a cooking appliance, which may be economical, efficient, and improved in usability, may be provided.

In addition, as the vacuum cooking appliance 100 may perform the vacuum packing while maintaining the food packing container p in a stable state so as to prevent the food from leaking out, the operation of the vacuum packing may be more conveniently and stably performed. Further, the vacuum cooking appliance 100 may allow configurations for implementing different functions, such as the configuration for vacuum packing the food packing container p and the configuration for heating the vacuum packed cooking material, to be integrally included in a single appliance, as well as may be manufactured in an appliance having a compact size and a simple exterior appearance, so that an installation space may be easily secured.

Embodiments disclosed herein provide a vacuum cooking appliance capable of simultaneously perform low-temperature cooking, such as sous-vide cooking, and a vacuum packing operation required for the low-temperature cooking in a single appliance. Embodiments disclosed herein also provide a vacuum cooking appliance capable of more conveniently and stably performing a vacuum packing operation. Embodiments disclosed herein further provide a vacuum cooking appliance capable of implementing different functions in a single appliance and being manufactured in a compact size.

A vacuum cooking appliance according to embodiments disclosed herein may include a housing provided to allow a housing mount and a vacuum packing module mount to be located at adjacent positions, a first container provided to allow a space configured to accommodate a liquid to be formed inside the first container, and coupled to the container mount, a heating part or heater configured to heat the liquid accommodated inside the first container, a vacuum pressure generator installed at the vacuum packing module mount and configured to suction air inside a food packing container, and a vacuum packing module installed adjacent to the vacuum pressure generator and including a sealer configured to heat and seal the food packing container. The housing may be formed in a frame shape in which a mounting hole may be formed, and the container mount and the vacuum packing module mount may be respectively formed to include the mounting hole therein. The first container may be formed in a hexahedral shape in which an accommodating space configured to accommodate the liquid may be formed and having an open upper portion.

The vacuum cooking appliance may further include a second container accommodated to be withdrawable in the accommodating space inside the first container and provided to allow a space configured to accommodate the liquid to be formed inside the second container. The second container may include a container main body in which a space configured to accommodate the liquid is formed, and may be formed in a hexahedral shape having an open upper portion, and a handle may be installed at a lateral side of the container main body and configured to be able to protrude from and retract to the lateral side. The vacuum cooking appliance may further include a cover installed at the housing and configured to open and close the open upper portion of the first container.

The second container may include a container main body inside of which a space configured to accommodate the liquid may be formed, and may be formed in a hexahedral shape having an open upper portion, and a container cover provided to cover the open upper portion of the container main body.

A packing bag accommodating space, in which a food packing container may be accommodated, may be formed between the container cover and the cover. A hinge may be installed at one side of the cover to pivotably connect one or a first side of the cover to the housing. A hook may be provided at another or second side of the cover. A latch mechanism or latch detachably coupled to the hook may be installed at the housing. The cover may be pivoted based on the one side at which the hinge is installed to open and close the open upper portion of the container main body, and the other side of the cover may be separably fixed to the housing through coupling of the hook and the latch mechanism.

A viewing window configured to view an inside of the first container, which may be closed by the cover, may be formed at the cover. The vacuum pressure generator may include a vacuum panel provided to allow an air inlet to be formed and installed at the vacuum packing module mount, and a vacuum pump configured to generate a vacuum pressure acting on the air inlet.

The vacuum cooking appliance may further include the cover installed at the housing and configured to open and close the open upper portion of the first container. A first seal formed in a closed curve shape enclosing a periphery of the air inlet may be installed at the vacuum panel, and a second seal may be installed at the cover and engaged with the first seal when the cover closes the upper portion of the first container to seal the periphery of the air inlet. The heating part may be a low-temperature heating part or heater configured to heat the liquid accommodated inside the first container at a temperature of about 100° C. or less.

The vacuum cooking appliance may further include a temperature controller configured to control an operation of the heating part to maintain a temperature of the liquid accommodated inside the first container at a set temperature. The vacuum cooking appliance may further include an outer case coupled outside the housing and configured to accommodate the housing inside the outer case, and a control panel installed at the outer case.

The vacuum cooking appliance may further include a cover mount installed at an upper portion of the housing and having an opening hole formed to pass through the cover mount and configured to open upward the first container, which may be installed at the container mount, and the vacuum packing module, and a cover installed at the cover mount and configured to open and close the opening hole, The first container may be in a box form in which an accommodating space may be formed and having an open upper portion, and a vacuum packing module mount may be formed in a form of a polygonal frame laterally that protrudes from the container mount at which the first container is installed.

The vacuum packing module mount may be provided at an upper portion of a front side adjacent to the container mount, and an electronic component space may be formed below the vacuum packing module mount. The electronic component space may be a space located in front of the first container and may be configured to include a region located below the vacuum packing module mounted on the vacuum packing module mount.

The vacuum cooking appliance may further include an outer case coupled outside the housing so as to accommodate the housing inside the outer case, in which an accommodating space configured to accommodate the housing, the first container, and the electronic component space may be formed, and configured to define an outer boundary surface of the electronic component space. The vacuum cooking appliance may further include a control panel installed at the outer case. The control panel may be installed on a front surface of the outer case adjacent to the electronic component space.

The first container may be in a box form inside of which an accommodating space may be formed and having an open upper surface, and the vacuum packing module mount may be formed in a form of a polygonal frame that protrudes forward from the first container. A lower surface of the vacuum packing module mount may be formed and located above a lower surface of the first container to allow the electronic component space to be formed at a region located below the vacuum packing module.

The vacuum pressure generator may include a vacuum panel provided to allow the air inlet to be formed and installed at the vacuum packing module mount, and a vacuum pump configured to generate a vacuum pressure acting on the air inlet. The sealer may be provided and located between the vacuum pressure generator and the first container, and may be configured to include a hot wire exposed to an upper portion of the vacuum panel.

The second container may include a container main body in a form of a box in which an accommodating space configured to the liquid is formed and having an open upper portion, and a container cover provided to cover the open upper portion of the container main body. A packing bag insertion part may be configured with a concave surface into which an open inlet side of a packing bag may be inserted and formed to allow the air inlet to pass through the packing bag insertion part, and a seating surface may be provided and formed at an upper portion of the container cover to allow the packing bag of which an inlet side is inserted into the vacuum panel to be seated.

The seating surface may be recessed downward from an edge of the container cover to configure a plane located below a plane configured by the packing bag insertion part. The vacuum cooking appliance may further include a cover mount installed at the upper portion of the housing and formed to allow the opening hole configured to open upward the first container and the vacuum packing module to pass through the cover mount, and a cover installed at the cover mount and configured to open the opening hole. The cover may be configured to include a pressurizing region facing the vacuum packing module when the cover closes the opening hole, and a covering region facing the container cover when the opening hole of the cover is closed, and a packing bag accommodating space may be formed between the covering region and the seating surface. A pressurizing member may be provided at the pressurizing region to pressurize the packing bag located above the sealer in a direction close to the sealer.

A first seal may be installed at the vacuum panel to enclose a periphery of the packing bag insertion part, and a second seal may be installed at the pressurizing region and configured to be engaged with the first seal when the opening hole of the cover is closed to seal the packing bag insertion part. At least one of the first seal or the second seal may be made of a buffer material.

The vacuum cooking appliance may further include a handle installed at a lateral portion of the container main body and capable of vertically protruding from and retracting into the lateral portion. The handle may be slidably coupled to the lateral portion of the container main body and changed to a hidden position at which the handle is located inside the first container and to a protruding position at which the handle protrudes over the first container.

Embodiments of a vacuum cooking appliance are described with reference to the accompanying drawings. For convenience of description, thicknesses of lines and sizes of components shown in the drawings may be exaggerated for clarity and convenience of explanation. In addition, the terms described below may be defined in consideration of the functions of the present disclosure, and these terms may be varied according to the intent or custom of a user or an operator. Therefore, these terms may be defined on the basis of the contents throughout the present application.

While the present disclosure has been described with reference to the embodiments shown in the drawings, these embodiments are merely illustrative and various modifications and equivalent other embodiments may be derived by those skilled in the art on the basis of the embodiments. Accordingly, the technical scope of the present disclosure should be determined by the following claims.

When an element or layer is referred to as being "on" another element or layer, the element or layer may be directly on another element or layer or intervening elements or layers. In contrast, when an element is referred to as being "directly on" another element or layer, there may be no intervening elements or layers present. As used herein, the term "and/or" includes any and all combinations of one or more of the associated listed items.

Although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. The spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cooking appliance, comprising:
a housing in which a container mount and a vacuum packing module mount are located at adjacent positions;
a first container configured to accommodate liquid inside an accommodation space therein and coupled to the container mount;
a heater configured to heat the liquid accommodated inside the first container;
a vacuum pressure generator installed at the vacuum packing module mount and configured to suction air inside a food packing container;
a cover installed at the housing and configured to open and close the open upper portion of the first container and the housing; and
a vacuum packing module installed adjacent to the vacuum pressure generator and including a sealer configured to heat and seal the food packing container and installed at the vacuum packing module mount, wherein the housing is in a frame shape and includes a mounting hole, and wherein the container mount and the vacuum packing module mount are formed to include the mounting hole therein.

2. The vacuum cooking appliance of claim 1, wherein the first container has an open upper portion and is in a hexahedral shape in which the accommodation space configured to accommodate the liquid is formed.

3. The vacuum cooking appliance of claim 1, further comprising:
a second container configured to be withdrawable from the accommodation space inside the first container and to accommodate liquid inside the second container.

4. The vacuum cooking appliance of claim 3, wherein the second container includes:
a container main body in which a space configured to accommodate the liquid is formed, wherein the container main body is formed in a hexahedral shape having an open upper portion; and
at least one handle installed at a lateral side of the container main body and configured to protrude from and retract into the lateral side.

5. The vacuum cooking appliance of claim 3, wherein the second container includes:
a container main body in which a space configured to accommodate the liquid is formed, wherein the container main body is formed in a hexahedral shape having an open upper portion; and
a container cover provided to cover the open upper portion of the container main body.

6. The vacuum cooking appliance of claim 5, wherein a packing bag accommodating space, in which a food packing container is accommodated, is formed between the container cover and the cover.

7. The vacuum cooking appliance of claim 6, wherein a hinge is installed at one side of the cover to pivotably connect a first side of the cover to the housing, a hook is provided at a second side of the cover, a latch detachably coupled to the hook is installed at the housing, the cover is pivoted based on the first side at which the hinge is installed to open and close the open upper portion of the container main body, and the second side of the cover is separably fixed to the housing through coupling of the hook and the latch.

8. The vacuum cooking appliance of claim 1, wherein a viewing window configured to view an inside of the first container is formed at the cover.

9. The vacuum cooking appliance of claim 8, wherein the vacuum panel is installed on the vacuum packing module mount and covers at least a portion of the mounting hole on the outside of the first container.

10. The vacuum cooking appliance of claim 1, wherein the vacuum pressure generator includes:
a vacuum panel provided to allow an air inlet to be formed and installed at the vacuum packing module mount; and
a vacuum pump configured to generate a vacuum pressure acting on the air inlet.

11. The vacuum cooking appliance of claim 10, further comprising:
a cover installed at the housing and configured to open and close an open upper portion of the first container, wherein a first seal formed in a closed curve shape enclosing a periphery of the air inlet is installed at the vacuum panel, and a second seal is installed at the cover and engages with the first seal when the cover closes the upper portion of the first container to seal a periphery of the air inlet.

12. The vacuum cooking appliance of claim 1, wherein the heater is a low-temperature heater configured to heat the liquid accommodated inside the first container at a temperature of about 100° C. or less.

13. The vacuum cooking appliance of claim 1, wherein the vacuum packing module mount is provided at an upper portion of a front side adjacent to the container mount, and an electronic component space is formed below the vacuum packing module mount, wherein the electronic component space is a space located in front of the first container and is configured to include a region located below the vacuum packing module mounted on the vacuum packing module mount.

14. The vacuum cooking appliance of claim 13, wherein the first container has an open upper portion and is in a form of a box in which an accommodating space is formed, the vacuum packing module mount is in a shape of a polygonal frame that protrudes forward from the first container, and a bottom surface of the vacuum packing module mount is formed and located above a lower surface of the first container to allow the electronic component space to be formed at a region located below the vacuum packing module.

15. The vacuum cooking appliance of claim 14, further comprising:
an outer case coupled outside the housing, in which an accommodating space configured to accommodate the housing, the first container, and the electronic component space is formed, and configured to define an outer boundary surface of the electronic component space.

16. The vacuum cooking appliance of claim 1, further comprising:
a second container configured to be withdrawable in the accommodation space inside the first container and to accommodate a liquid inside the second container, wherein the second container includes:
a container main body in which an accommodating space for the liquid is formed, the container main body being in a form of a box having an open upper portion; and
a container cover provided to cover the open upper portion of the container main body, wherein a packing bag insertion portion is formed at a vacuum panel, is configured with a concave surface into which an open inlet side of a packing bag is placed, and is formed to allow an air inlet to pass through the packing bag insertion portion, and wherein a seating surface is formed at an upper portion of the container cover to allow a portion of the packing bag to be seated.

17. The vacuum cooking appliance of claim 16, wherein the seating surface is recessed downward from an edge of the container cover to form a plane located below a plane formed by the packing bag insertion portion.

18. A vacuum cooking appliance, comprising:
a housing in which a container mount and a vacuum packing module mount are located at adjacent positions;
a first container configured to accommodate liquid inside an accommodation space therein and coupled to the container mount;
a heater configured to heat the liquid accommodated inside the first container;
a vacuum pressure generator installed at the vacuum packing module mount and configured to suction air inside a food packing container;
a cover installed at the housing and configured to open and close the open upper portion of the first container and the housing; and
a vacuum packing module installed adjacent to the vacuum pressure generator and including a sealer configured to heat and seal the food packing container, wherein the vacuum packing module mount is provided at an upper portion of a front side adjacent to the container mount, and an electronic component space is formed below the vacuum packing module mount, and wherein the electronic component space is a space located in front of the first container and is configured to include a region located below the vacuum packing module mounted on the vacuum packing module mount, and wherein the first container has an open upper portion and is in a form of a box in which an accommodating space is formed, the vacuum packing module mount is in a shape of a polygonal frame that protrudes forward from the first container, and a bottom surface of the vacuum packing module mount and is formed and located above a lower surface of the first container and the vacuum pressure generator to allow the electronic component space to be formed at a region located below the vacuum packing module.

19. The vacuum cooking appliance of claim 18, wherein the vacuum cooking appliance further comprises an outer case coupled outside the housing, in which an accommodating space configured to accommodate the housing, the first container, and the electronic component space is formed, and configured to define an outer boundary surface of the electronic component space.

* * * * *